INVENTOR.
ABRAHAM R. BAROODY

United States Patent Office 3,255,964
Patented June 14, 1966

3,255,964
WARM AIR HEATING SYSTEM CONTROL
Abraham R. Baroody, 7 Sherrill St., Geneva, N.Y.
Filed Jan. 27, 1964, Ser. No. 340,289
6 Claims. (Cl. 236—9)

This invention relates to a warm air heating system, and more particularly to a system of controls for a warm air furnace which is provided with an electrically controlled burner and an electrically operated blower for circulating the air through the furnace to the space to be heated.

Usually a warm air furnace control system employs a room thermostat for demanding heat in the space to be heated and, also, a thermostatically operated switch in the bonnet of the furnace for cutting off operation of the burner before the furnace becomes overheated and for preventing circulation of air before it has become heated. In such a system, when the room thermostat calls for heat, the burner is turned on and then, when the furnace has become sufficiently heated, the blower is turned on by the action of the bonnet switch. Warm air is circulated by the blower until the room where the thermostat is located reaches the temperature for which the thermostat has been preset. The thermostat no longer demands heat and the burner is thereby shut off.

Due to the heat retained in the furnace, however, the bonnet switch frequently remains on, calling for operation of the blower to prevent overheating of the furnace. Warm air therefore continues to circulate causing the room containing the thermostat to become heated above the temperature called for by the thermostat by as much as 8 to 10 degrees. This results in discomfort for the occupants of the room and a waste of fuel.

Systems for preventing this "overrunning" of the thermostat have been suggested including the provision of a small heater at the thermostat to give a false temperature sensing. Other systems suggested employ methods having stages or ranges of temperature in which both burner and blower operate and other ranges in which only one or the other operate. All such systems require a proliferation of temperature sensing means which not only are expensive to install but frequently get out of order.

The principal object of the present invention, accordingly, is to provide a control system with the minimum number of thermostatically operated controls for preventing both overheating of the space to be heated and overheating of the furnace.

Another important object is to provide a control system which is easy and economical to install and maintain, and which is dependable in operation.

A further object is to provide a control system to prevent overheating, which system is safe and positive in action and which may be easily and economically installed on existing facilities with the minimum of added parts.

Figure 1:
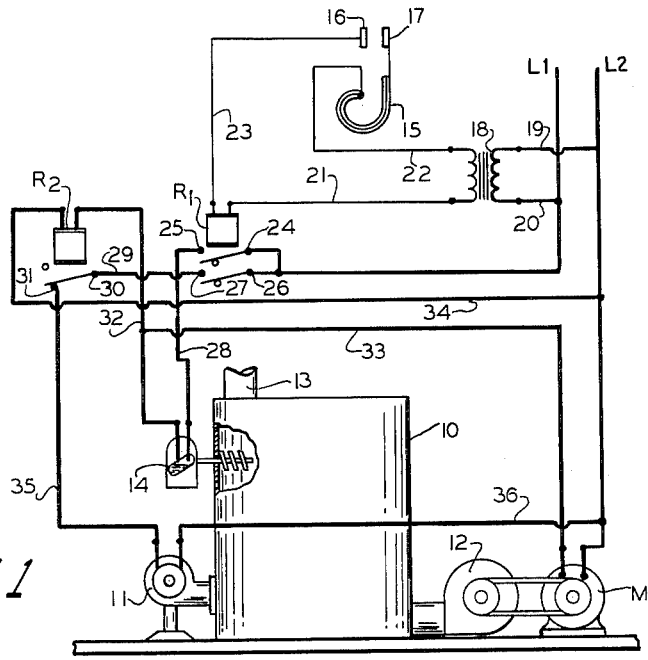
Figure 2:
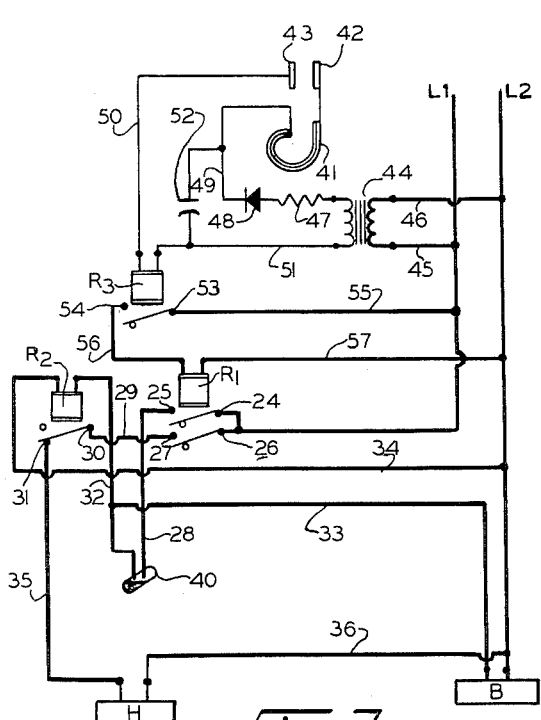
Figure 3:
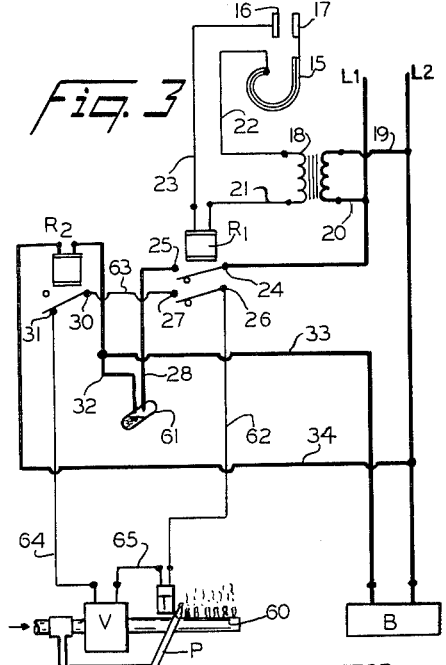

Other objects and advantages will become apparent from the following specification in conjunction with the accompanying drawing, in which:

FIGURE 1 is a diagrammatic view of a furnace and heating system provided with controls for operating in accordance with the invention; and FIGURES 2 and 3 are diagrammatic drawings of modified forms of the controls for the heating system shown in FIG. 1.

Referring more particularly to FIGURE 1, a furnace 10 is provided with a burner 11 for heating air in the bonnet or upper part of the furnace, and a blower 12 for circulating air through the furnace and through duct 13 to the space to be heated. Blower 12 is operated by an electric motor M, but for convenience the combination blower and motor will be referred to hereinafter as the blower.

Burner 11 is represented as an electrically controlled oil burner but it will be apparent that it may be any other electrically controlled means for heating the air in the furnace.

The furnace 10 is provided with a bonnet switch 14 which is thermostatically operated according to the temperature of the air in the bonnet. Switch 14 is represented as a conventional mercury switch but any other thermostatically operated switch may be used so long as its contacts are adapted to close upon the furnace reaching a selected critical temperature and to open when the furnace temperature falls below the critical temperature.

Above the furnace, in one of the rooms heated by the furnace, a thermostat 15 is located. The thermostat is conventional, and is represented as having a stationary contact 16 and a movable contact 17 carried on the thermally responsive arm of the device. Contacts 16 and 17 are adapted to close at temperatures below a selected temperature and to open at temperatures above that selected.

A source of electric current is represented by the wires L1 and L2 and the primary winding terminals of the transformer 18 are connected to L1 and L2, respectively, by wires 19 and 20. The secondary winding terminals of the transformer furnish current for a control circuit, shown in light lines to indicate comparatively lower voltages, through the thermostat contacts 16 and 17 to the coil of a relay R1. One terminal of relay R1 is connected by wire 21 to one of the secondary terminals of transformer 18 and the other secondary terminal is connected to contact 17 by the wire 22. Contact 16 of the thermostat is connected by a wire 23 to the other terminal of relay R1.

Relay R1 is provided with two sets or pairs of normally open contacts 24, 25 and 26, 27. Contacts 24 and 26 are connected to the current source wire L1, and contact 25 is connected by a wire 28 to one contact of bonnet switch 14. Contact 27 is connected by a wire 29 to contact 30, one of the normally closed pair of contacts 30, 31, of a second relay R2. Wires 28 and 29 and all other wires at line voltage are represented by comparatively heavy lines in all the figures of the drawing.

The other contact of bonnet switch 14 is connected by a wire 32 to one coil terminal of relay R2 and by wire 33 to one terminal of the blower 12. The other terminal of blower 12 is connected to the current source wire L2, and the other terminal of the relay R2 is connected to wire L2 by the wire 34.

The other contact 31 of relay R2 is connected by a wire 35 to one terminal of burner 11 and the other burner terminal is connected by a wire 36 to the wire L2.

The relay R2 and blower 12 are thus connected in parallel in a circuit through the contacts 24 and 25 of relay R1 and thence through the contacts of the bonnet switch 14. Burner 11 is connected in another circuit through contacts 26 and 27 of relay R1 and thence through the normally closed pair of contacts 30, 31 of relay R2.

In operation, the burner 11 is turned on by the closing of the demand contacts 16, 17 of the thermostat 15, the control circuit from transformer 18 being completed to the relay R1. Relay R1, being energized, the contacts 24, 25 of the relay close but the circuit to blower 12 is not completed until the furnace 10 becomes heated and the contacts of the bonnet switch 14 close. Contacts 26 and 27 of relay R1 are also closed and a circuit is completed from line L1 through contacts 26 and 27, wire 29, contacts 30 and 31 of relay R2, and wire 35 to the burner, which is connected by wire 36 to line L2. The burner 11 is thus turned on by the closing of the thermostat contacts.

When the air in the furnace becomes heated switch 14 closes and the circuit to blower 12 is completed. The blower operates to circulate heated air to the space where the thermostat 15 is located. But on completion of the circuit to blower 12, relay R2, being in parallel with the blower, also becomes energized and the circuit to burner 11 is broken as the contacts 30, 31 of relay R2 open.

Blower 12 continues to operate until the heat in the furnace is partially dissipated and the contacts in bonnet switch 14 again open to complete the cycle. When switch 14 opens, the circuit to blower 12 is broken as is the circuit to relay R2. When relay R2 is deenergized its contacts 30, 31 close again completing the circuit to turn on the burner 11.

It has been found that there is a delay or lag in the operation of all bonnet switches. When the temperature in the bonnet of the furnace is rising the contacts do not immediately close when the critical temperature is reached, and when the bonnet temperature is falling there is a similar delay after the critical temperature in the bonnet is reached. There is a similar lag in the furnace. After the burner goes off, heat from the combustion chamber continues to be transferred to the air in the bonnet so that the bonnet temperature does not begin to fall immediately after the burner ceases to operate.

It is this lag, or time delay, which governs the cycling of the burner and the blower in the control system of the present invention and the frequency of the cycling has been found entirely satisfactory. It will be apparent that a bonnet switch designed to increase or decrease this time lag may be used with equally satisfactory results.

So long as the thermostat contacts 16, 17, remain closed, relay R1 remains energized and burner and blower alternate in operating as called for by switch 14.

When the temperature at thermostat 15 reaches the selected temperature for which it has been set, contacts 16 and 17 open, deenergizing relay R1. Contacts 24, 25 and 26, 27 again open and, regardless of whether burner or blower is operating at the time, all circuits to burner and blower are broken. Since the burner is turned off in its alternating cycle with the blower whenever the bonnet switch is operated to close, the temperature of the furnace never rises substantially above the selected critical temperature and overheating of the furnace is prevented. If the blower is operating it is turned off at once by the opening of the thermostat contacts 16, 17 so that overheating of the space to be heated is also prevented.

When the temperature of the room at the thermostat again falls, relay R1 is again energized and operation of either burner 11 or blower 12 is initiated according to the closed or open condition of switch 14 at that time.

It will be apparent that the hereinabove described system of controls is adapted for installation in warm air heating systems already provided with a thermostat and bonnet switch. In such a system it may be advantageous to employ a modified system of controls such as illustrated in FIGURE 2. In this modified system the relay R2 is operated, not directly by the control circuit, but indirectly by the operation of a third relay which is operated by the control circuit.

In FIGURE 2, the burner of a furnace is represented at H, the blower at B, and the bonnet switch at 40. A thermostat is represented at 41 and has contacts 42 and 43 adapted to close upon the temperature dropping below a preset selected temperature and to open when the temperature rises above the preset point.

The primary terminals of a transformer 44 are connected by wires 45 and 46 to a source of current again represented by wires L1 and L2. The secondary terminals of the transformer are connected in a control circuit, shown in light lines, through contacts 42, 43 to the control relay R3. One transformer terminal is connected through a resistance 47, a rectifier 48, and a wire 49 to contact 42, and a wire 50 connects contact 43 to one terminal of relay R3. The other terminal of the relay is connected by a wire 51 to the other secondary terminal of the transformer 44.

A capacitor 52, part of the low voltage D.C. control circuit is connected between wires 49 and 51 to insure the smooth operation of the relay R3.

The relay R3 has a pair of normally open contacts 53 and 54 connected, respectively, by wires 55 and 56 to current supply wire L1 and to one terminal of the relay R1. The other terminal of relay R1 is connected by wire 57 to the other current supply wire L2.

Relay R1 has two sets of normally open contacts and a relay R2 has a pair of normally closed contacts just as the similarly numbered relays shown in FIGURE 1, and these contacts operate circuits to the burner and blower just as described hereinabove in connection with FIGURE 1, the contacts and connecting wires in FIGURE 2 being given the same reference numbers as the corresponding electrical connections in FIGURE 1.

The operation of the control system shown in FIGURE 2 is the same as that described in connection with FIGURE 1 except that the closing of thermostat contacts 42, 43 energizes relay R1 indirectly by completing the control circuit through the coil of relay R3. Energizing relay R3 closes its contacts 53, 54 completing the auxiliary control circuit at line voltage from line L1, through wire 55, contacts 53, 54, wire 56 and through the coil of relay R1, which is connected by wire 57 to line L2.

When the thermostat contacts 42, 43 close, therefore, relay R1 is energized and, when the contacts 42, 43 open, contacts 24, 25 and 26, 27 of relay R1 return to their normal or open position.

It will be apparent that the modified control system shown in FIGURE 2 is useful where it is desired to use an already installed thermostat not capable of carrying a control circuit current of sufficient magnitude for energizing the relay R1.

Another modification of the control system of the invention is shown in FIGURE 3 in which the blower is represented at B, the burner is represented as a gas burner 60, and the bonnet switch is represented at 61. The burner 60 is provided with a pilot burner P and is electrically operated by a normally closed, solenoid-operated valve V. Such a burner is entirely conventional and, as a safety device, many such burners are provided with a thermoelectric generator or thermopile such as is represented at T. The thermopile T is operated by the heat of the pilot flame and furnishes a current of sufficient magnitude to operate the valve V, the safety feature being that when the pilot goes out there can be no current generated to open valve V.

A transformer 18, connected to electrical supply wires L1 and L2, furnishes current for a control circuit, shown in light lines, through the contacts of room thermostat 15 to the coil of a relay R1 just as shown and described in connection with FIGURE 1, like parts being given the same number in each figure.

Relay R1 has one of its two pairs of normally open contacts wired in a circuit through the bonnet switch to the blower B as follows: Supply wire L1, contacts 24, 25, wire 28, the contacts of bonnet switch 61, wires 32 and 33, blower B and supply wire L2. Included in this circuit in parallel with the blower B is the relay R2, one of whose terminals is connected to the wire 32, the other terminal being connected to supply line L2 by wire 34, all just as shown and described in connection with FIGURE 1.

The other pair of normally open contacts 26, 27, of relay R1, however, is connected in the circuit from the thermopile T to the burner valve V. Wire 62 connects contact 26 to one terminal of the thermopile, and a wire 63 connects contact 27 to one contact 30 of the normally closed pair of contacts of relay R2. The other contact 31 of this pair is connected by a wire 64 to one terminal of the solenoid of valve V, the other solenoid terminal being connected by wire 65 to the other terminal of thermopile T.

It will be apparent that this latter circuit to operate the valve V, which circuit is also shown in light lines in FIGURE 3, is similar to the circuit L1, 26, 27, 29, 30, 31, 35, 11, 36, L2 of FIGURE 1, the only difference being that the source of electric current to operate the turning on and off of the burner is the thermopile T in FIGURE 3 instead of the supply wires L1 and L2 in FIGURE 1. Each burner circuit includes the normally open contacts 26 27 of relay R1 and the normally closed contacts 30, 31 of relay R2.

The operation of the control system of FIGURE 3 is similar to that shown and described in connection with FIGURE 1. When heat is demanded by the closing of thermostat contacts 16 and 17, relay R1 is energized through the circuit 22, 15, 17, 16, 23, R1, 21, from the transformer 18.

Closing of the contacts of relay R1 sets up a circuit through the bonnet switch 61 to the blower B and to the coil of relay R2, which is wired in parallel in the circuit with the blower. However, until the bonnet switch is closed as previously described, the blower is not actuated and relay R2 is not energized.

Closing of the contacts of relay R1 also completes the circuit, through the normally open contacts 26, 27 and normally closed contacts 30, 31 or relay R2, from the thermopile T to the burner operating valve V.

So long as the thermostat contacts remain closed, the circuit from Thermopile T, wire 62, relay contacts 26 and 27, wire 63, relay contacts 30 and 31, wire 64, through the solenoid of valve V, and wire 65 to the Thermopile T causes the valve V to open and admit gas to the burner 60 to supply heat. When the furnace warms, bonnet switch 61 closes, completing the circuit L1, 24, 25, 28, 61, 32, 33, B, L2 and energizing relay R2 through its connections 32 and 34. As relay R2 is energized the circuit to the burner is broken by the opening of contacts 30, 31.

When bonnet switch 61 again opens because of the cooling of the furnace by the operation of blower B, the circuit to the blower B and relay R2 is again broken, blower B ceasing to operate, and the closing of contacts 30, 31 setting up an operating current to the burner.

When the temperature at thermostat 15 rises to the selected temperature, contacts 16, 17 open and relay R1 is deenergized, breaking all operating circuits to both blower and burner until further heat is again called for by closing of the thermostat contacts.

It will be apparent from the foregoing that the control circuit utilizing the third relay R3 as shown in FIGURE 2 may equally well be used in connection with the control system shown and described in connection with FIGURE 3.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. A control system for a hot air furnace including electrically responsive burner means for supplying heat to the furnace and an electrically responsive blower device for circulating the air heated thereby, comprising: a room thermostat having a single pair of electrical demand contacts, a thermostatically operated bonnet switch having a single pair of electrical contacts adapted to close at a critical furnace temperature and to open when heat falls below the critical temperature, electrically operated switching means responsive to the operation of said room thermostat and operative when energized to close two pairs of normally open electrical contacts, and a second electrically operated switching means operative when energized to open a single pair of normally closed electric contacts, one pair of said normally open contacts being connected in a circuit through said bonnet switch to a source of electric current which circuit includes connections for actuating said blower device and for energizing said second switching means, said burner means being operatively connected in another circuit to a source of electric current through said normally closed pair of contacts and the other pair of said normally open contacts, whereby said burner is operative when the blower is inoperative and said burner is inoperative when the blower is operative so long as the room thermostat is operative to demand heat.

2. A control system for a hot air furnace including an electrically operated burner for supplying heat to the furnace and an electrically operated blower for circulating the air heated thereby, comprising: a room thermostat having a pair of electrical demand contacts adapted to close when lowered room temperature operates the thermostat, a thermostatically operated bonnet switch having contacts adapted to close when the furnace temperature rises to a preset limit and to open when the furnace temperature falls below the limit, a first relay having two pairs of normally open switch contacts, a second relay having a single pair of normally closed switch contacts, a control circuit through the thermostat contacts to operate the first relay, said control circuit including transformer means connected to a source of electric current, an operating circuit from a source of electric current through one pair of the first relay contacts and through the bonnet switch contacts, said operating circuit including parallel electrical connections to the blower and to the second relay, and a cut-out circuit from a source of electric current through the other pair of first relay contacts and through the normally closed contacts of the second relay to the burner.

3. A control system as defined in claim 2 wherein said burner has a pilot flame and the source of electric current for said cut-out circuit comprises a thermo-electric generator powered by said pilot flame.

4. A control system for a hot air furnace including an electrically operated burner for supplying heat to the furnace and an electrically operated blower for circulating the air heated thereby, comprising: a room thermostat having a pair of contacts adapted to close when lowered room temperature operates the thermostat, a thermostatically operated bonnet switch having contacts adapted to close when the furnace temperature rises to a preset limit and to open when the furnace temperature falls below the limit, a first electrically operated switch responsive of the opening and closing of the thermostat contacts and having a pair of normally open contacts adapted to close to complete a circuit from a source of electric current, a second electrically operated switch having two pairs of normally open contacts and operated by the completion of said circuit, a control circuit from a source of electric current through the thermostat demand contacts to the first switch, a third electrically operated switch having a pair of normally closed contacts, a series circuit from a source of electric current to the blower through one pair of the second switch contacts and the bonnet switch contacts, said series circuit having in parallel therewith connections for operating the third switch upon closing the circuit to the blower, and a cut-out circuit from a source of electric current through the other pair of the second switch contacts and through the normally closed third switch contacts to the burner.

5. A control system as defined in claim 4 wherein each circuit is from a common source of electric current, the control circuit through the thermostat contacts to the first electrically operated switch including a transformer, a resistor, a rectifier, and a capacitor, the capacitor being connected across the transformer secondary, the resistor and rectifier.

6. A control system as defined in claim 4 wherein the burner has a pilot flame and the source of electric current through the normally closed third switch contacts for operating the burner in a thermo-electric generator operated by the pilot flame.

References Cited by the Examiner

UNITED STATES PATENTS

| | | | |
|---|---|---|---|
| 1,991,680 | 2/1935 | Jones | 236—11 |
| 2,230,446 | 2/1941 | Baker | 236—9 |
| 2,801,055 | 7/1957 | Seifert | 236—9 |
| 2,879,358 | 3/1959 | Hilgert | 236—21 X |
| 3,126,154 | 3/1964 | Shoalts | 236—9 |

EDWARD J. MICHAEL, *Primary Examiner.*